United States Patent [19]
Collier et al.

[11] 4,275,752
[45] Jun. 30, 1981

[54] FLUID FLOW APPARATUS AND METHOD

[76] Inventors: Nigel A. Collier, 13 Frome Close, Cove, Farnborough, Hampshire, England; John H. Clements, 9 Krooner Rd., Camberley, Surrey, GV15 2AP, England

[21] Appl. No.: 78,461

[22] Filed: Sep. 24, 1979

[30] Foreign Application Priority Data

Sep. 22, 1978 [GB] United Kingdom ............... 37832/78

[51] Int. Cl.³ ............................................ G05D 11/00
[52] U.S. Cl. ......................................... 137/7; 137/10; 137/88
[58] Field of Search ................. 73/23, 1 G; 137/7, 10, 137/88, 599

[56] References Cited

U.S. PATENT DOCUMENTS

| 1,783,163 | 11/1930 | Griswold, Jr. | 137/599 |
| 2,800,915 | 7/1957 | Tavener | 137/88 |
| 3,702,619 | 11/1972 | Son | 137/88 |
| 3,722,510 | 3/1973 | Parker | 137/88 |
| 3,809,109 | 5/1974 | Breiling et al. | 137/88 |
| 3,841,344 | 10/1974 | Slack | 137/88 |
| 3,976,450 | 8/1976 | Marcote et al. | 73/1 G |
| 4,022,234 | 5/1977 | Dobritz | 137/7 |
| 4,063,446 | 12/1977 | Fuhrmann | 73/1 G |

FOREIGN PATENT DOCUMENTS 857927 1/1961 United Kingdom .
915432 1/1963 United Kingdom .

Primary Examiner—William R. Cline
Assistant Examiner—H. Jay Spiegel
Attorney, Agent, or Firm—Schwartz & Weinrieb

[57] ABSTRACT

Apparatus for combining fluid flows in variable proportions is adapted for blending an active constituent gas and a diluent gas to calibrate gas analyzers used in monitoring pollution.

Diluent gas passes from source 34 through a downstream differential pressure regulator 17 and a constant flow restrictor 12 to outlet 14 which communicates with control port 20 of regulator 17. Active gas passes from source 35 through differential pressure regulator 23, through three fixed parallel flow restrictors 22, 29 and 30 to combine with the diluent gas upstream of restrictor 12. Control port 26 of regulator 23 communicates with the input to restrictor 12. Switching of valves 31, 32 and 33 varies the rate of flow along conduit 16 and hence the proportions of gases combined upstream of restrictor 12. Regulator 23 maintains flow along 16 substantially constant for given valve settings, and regulator 17 maintains flow along outlet 14 substantially constant despite changes in flow rate in the conduit 16.

8 Claims, 3 Drawing Figures

FLUID FLOW APPARATUS AND METHOD

FIELD OF THE INVENTION

This invention relates to an apparatus and method for combining two or more fluid flows, and is concerned in particular but not exclusively with apparatus for combining in required proportions a toxic, pollution gas, and a diluent gas to provide a calibration sample for testing pollution measuring equipment.

BACKGROUND OF THE INVENTION

In recent years governments of industrialised countries have become increasingly concerned with control of pollution of the atmosphere by exhaust gases from engines and machinery, in particular from internal combustion engines of automobiles. Car manufacturers are commonly required to impose stringent tests on the pollution content of exhaust gases, and usually this is carried out by the manufacturer at his factory. There are available numerous types of measuring equipment for testing the pollution content of automobile exhaust gases and the type and standards of the pollution measuring equipment are set by the government concerned. Often the cars will be imported into the country setting the pollution standards, and for this and other reasons governments are becoming increasingly concerned with the maintenance of the pollution measuring equipment itself to the required standards of accuracy.

There has therefore grown up a requirement for equipment to test the pollution measuring equipment, and this is usually done by passing through the pollution measuring equipment a gas comprising a standardized pollution gas of a specified strength and composition, combined with and diluted by a relatively inert gas which does not affect the pollution measuring equipment. Commonly the active constituent gas consists of $NO_2$ and the diluent gas consists of air. The test is carried out by mixing the active gas and the diluent in a series of different proportions, and feeding the resultant mixtures in sequence through the pollution testing equipment and reading the results from the testing equipment. The recorded results are then compared with the known proportions of the test gases, to determine whether the required linearity has been maintained by the pollution testing equipment.

The present invention is concerned, in a particular aspect with the problem of preparing the required test gases in varying concentrations. In known arrangements, the active constituent is added to the diluent in required proportions by volume by varying the rates of flow of the two flows of gas. Commonly one of the gases is set at a constant flow, and the rate of the other gas is increased or decreased as required to vary the proportions. The disadvantage of this arrangement is that the resultant combined flow of the two gases varies in its total rate of flow, and such variation in rate of flow of the combined test gas prevents accurate checking of the pollution testing equipment. Where an attempt has been made to provide a constant rate of flow for the combined test gas, this has involved the venting to atmosphere a proportion of the combined test gas. Since the gases involved in the testing are commonly toxic, this venting to atmosphere of unwanted pollution gases has proved a disadvantage of previous arrangements for checking pollution testing equipment. A further disadvantage of previous testing methods has been that the venting to atmosphere of varying amounts of the active constituent and/or diluent gas of the test gases has been wasteful of the gases used. Since the preparation of these standardized gases is necessarily carried out with considerable accuracy, waste of the gases used can prove unnecessarily expensive.

OBJECTS OF THE INVENTION

It is an object of the present invention, in its form concerned with the testing of pollution measuring equipment, to provide a simple apparatus for combining fluid flows which obviates or reduces the disadvantages outlined above, and a corresponding method.

SUMMARY OF THE INVENTION

According to the present invention there is provided apparatus for combining fluid flows, comprising a flow restrictor having an inlet and an outlet for the flow of fluid through the restrictor, a first supply conduit for supplying a first fluid to the inlet of the restrictor, a second supply conduit for supplying a second fluid to the inlet of the restrictor, and control means coupled between the outlet of the restrictor and the first supply conduit for maintaining the pressure across the restrictor substantially constant in normal operation whereby the output flow from the restrictor is maintained substantially constant for a given restriction of the flow restrictor.

It is to be appreciated that there may be provided more than two supply conduits for supplying more than two fluids to the inlet of the flow restrictor, so that more than two fluid flows may be combined in apparatus according to the invention. However, for simplicity the invention will be set out in the following paragraphs in terms of two conduits for supplying fluids even though other supply conduits may be present.

In a preferred form of the apparatus according to the invention, the control means comprises a control device having an inlet port and outlet port, and a control port, the control device being adapted to vary the flow of fluid through the control device in response to changes in the pressure at the control port in such a manner as to tend to maintain a constant pressure difference between the outlet and control ports of the control device. Conveniently such a control device is arranged with the inlet and outlet ports connected in the first supply conduit for passage of the first fluid through the control device, and the control port is connected to communicate with the outlet of the flow restrictor, the control device being arranged to vary the flow of the first fluid through the control device in response to the pressure at the control port.

Conveniently the first and second supply conduits are interconnected at a junction downstream of the outlet port of the control means.

Conveniently the control device may comprise a device known as a differential pressure regulator which is capable of performing the functions set out above. In one form, a differential pressure regulator may comprise a variable restriction in a passage between the inlet and outlet ports, the restriction being variable by a control member such as a diaphragm which is responsive to the pressure at the control port.

In a preferred form of the apparatus according to the invention the main flow restrictor may be such as to impose a constant restriction on the flow therethrough, but in other arrangements the main restrictor may impose a restriction which is selectively variable.

Also in preferred forms of the apparatus, a flow regulator means is connected in the second supply conduit and arranged to provide a predetermined flow along the second supply conduit. Preferably the flow regulator is adapted to provide a selectively variable flow along the second supply conduit. Conveniently the flow regulator may be adapted to provide a series of different, constant rates of flow of the second fluid, the flow regulator being switchable to select the required flow.

Preferably the flow regulator means in the second conduit comprises a further flow restrictor connected in the second supply conduit and a further control device of the form set out hereinbefore, the further control device having its inlet and outlet ports connected in the second supply conduit upstream of the further flow restrictor for flow of the second fluid through the further control device to the further flow restrictor, the control port of the further control device being connected to communicate with the outlet of the further flow restrictor and the control device being arranged in such a manner as to maintain substantially constant the pressure across the further flow restrictor to maintain substantially constant the flow from the further flow restrictor along the second supply conduit for a given restriction therein.

To provide a selectively variable flow through the second supply conduit, the said further flow restrictor may be of variable restriction, or the flow regulator may conveniently comprise a plurality of further flow restrictors connected in parallel between the outlet of the said further control device and the inlet of the main flow restrictor, and a plurality of valves connected to allow the flow along the second supply conduit to be selectively switched through different further flow restrictors or combinations of different further flow restrictors. Conveniently each further flow restrictor may be connected in series with a valve individual thereto. Further conveniently the restriction values of the said further flow restrictors may be arranged in a binary progression, so that by switching various combinations of the further flow restrictors into and out of operation, the total flow through the second supply conduit may be switched through a lineally increasing series of values. It will be appreciated that in such an arrangement, by maintaining the flow through the main flow restrictor at a constant value, and varying the flow along the second supply conduit, the concentration of the second fluid in the first fluid can be selectively varied through desired values whilst maintaining the total output flow of the combined fluids at a constant value.

It will be appreciated therefore that the invention has particular application where the first and second fluids comprise an active constituent gas and a diluent gas to be combined to provide a test gas for testing pollution measuring equipment. There is therefore provided in accordance with the present invention in another aspect, apparatus for providing a test gas for testing a pollution measuring equipment, comprising means for supplying an active constituent of a pollution gas, means for supplying a diluent gas, and apparatus (as set out in accordance with the invention hereinbefore) for combining the active constituent gas and the diluent gas in selectively variable proportions, the said combining apparatus being arranged to provide a combined output test gas having a total flow which is maintained substantially constant in normal operation.

It is to be appreciated that where the term active constituent gas is used, this merely indicates the constituent gas of the pollution which is to be tested, and does not necessarily indicate that the gas is "active" in a particular chemical sense. In the art, the active constituent gas in such a pollution test is commonly referred to as the span gas, and the diluent gas is referred to as the zero gas.

The various preferred features set out in accordance with the present invention may be combined in certain preferred arrangements. For example in accordance with one preferred aspect of the present invention there is provided apparatus for combining fluid flows in variable porportions comprising a main flow restrictor having an inlet and an outlet for flow of fluid through the restrictor, a first supply conduit for supplying a first fluid to the inlet of the restrictor, a second supply conduit for supplying a second fluid to the inlet of the restrictor, variable flow regulator means connected in the second supply conduit for providing a selectively variable flow along the second supply conduit, and control means coupled between the outlet of the restrictor and the first supply conduit for maintaining the pressure across the restrictor substantially constant in normal operation whereby the output flow from the restrictor is maintained substantially constant for a given restriction of the said flow restrictor despite changes in the fluid flow in the second supply conduit.

There is further provided in accordance with one particularly preferred arrangement of the invention, apparatus for combining fluid flows in variable proportions comprising a main flow restrictor having an inlet and an outlet for flow of fluid through the restrictor, a first supply conduit for supplying a first fluid to the inlet of the main flow restrictor, a second supply conduit for supplying a second fluid to the inlet of the main flow restrictor, first and second control devices, each control device having individual thereto an inlet port and an outlet port, and a control port for varying the flow of fluid through the control device in response to changes in the pressure at the control port and in such a manner as to tend to maintain a constant pressure difference between the outlet and control ports of the control device, a plurality of further flow restrictions connected in parallel with each other in the second supply conduit, a plurality of switchable valves connected to allow the flow along the second supply conduit to be selectively switched through different further flow restrictions or combinations of different further flow restrictors so as to vary the flow rate along the second supply conduit, the inlet and outlet ports of the first control device being connected in the first supply conduit for passage of the first fluid through the first control device, and the inlet and outlet ports of the second control device being connected in the second supply conduit upstream of the said further flow restrictors for passage of the second fluid through the second control device, the control port of the second control device being connected to communicate with the outlets of the said further flow restrictors at a common junction thereof for maintaining the flow through the second supply conduit substantially constant for any given selected combination of the further flow restrictors, and the control port of the first control device being connected to communicate with the outlet of the main flow restrictor for maintaining the output flow from the main flow restrictor substantially constant despite changes in the flow of fluid in the second supply conduit due to the selection of different combinations of the further flow restrictors for the purpose of varying the proportions of the first and second fluids combined.

In addition to the apparatus aspects of the invention which have been set out above, there are provided various method aspects of the invention which correspond generally to the preferred features set out with regard to the apparatus. In particular, there is provided in accordance with the invention a method of combining fluid flows comprising the steps of passing a flow of a first fluid through a controlled variable flow restriction, combining the output of first fluid from the controlled flow restriction with a flow of a second fluid, passing the combined flow of the first and second fluids through a main flow restriction and varying the said controlled flow restriction in dependence upon the pressure at the output of the said main flow restriction in such a manner as to tend to maintain substantially constant the pressure across the main restrictor.

In accordance with a third aspect of the invention there is provided a method of combining fluid flows comprising the steps of passing a flow of a first fluid through a controlled variable flow restriction, combining the output of first fluid from the controlled flow restriction with a flow of a second fluid, passing the combined flow of the first and second fluids through a main flow restriction, varying the rate of flow of the second fluid relative to the rate of flow of the first fluid so as to vary the proportions of the fluids combined together, and varying the said controlled variable flow restriction in dependence upon the pressure at the output of the said main flow restriction in such a manner as to tend to maintain substantially constant the pressure across the main restrictor and to maintain substantially constant the rate of flow of the output of the combined fluids from the main restriction despite changes in the rate of flow of the second fluid to be combined with the first fluid.

BRIEF DESCRIPTION OF THE DRAWING

Embodiments of the invention will now be described by way of example with reference to the accompanying drawings in which.

DETAILED DESCRIPTION OF THE ILLUSTRATED EMBODIMENTS

The embodiments described hereinafter are in principle equally operable with gases and liquids, but will be described in the preferred form shown, in relation to the combining of gases.

Figure 1:
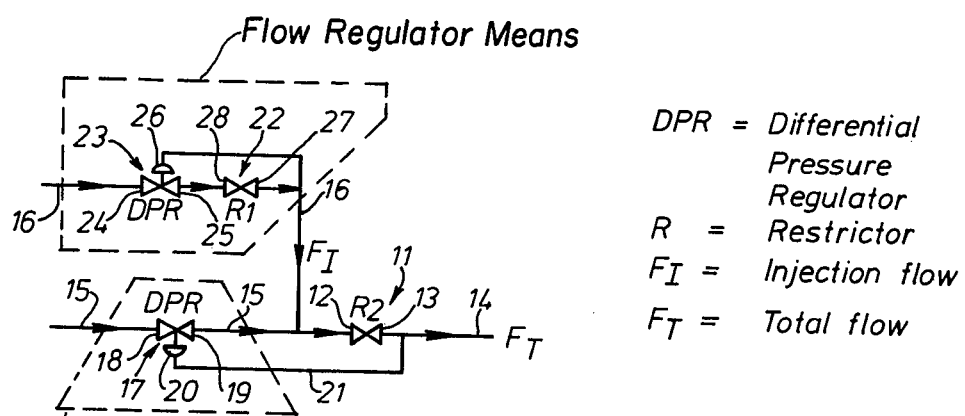
FIG. 1 shows in diagrammatic form apparatus embodying the invention for combining two fluid flows.

Referring firstly to FIG. 1, a main flow restrictor 11 has an inlet 12 and an outlet 13, the outlet 13 being connected to an outlet conduit 14. A first supply conduit 15 is connected to the inlet 12 of the main fluid restrictor 11 and is arranged for supplying a first gas under pressure to the restrictor 11. A second supply conduit 16 is connected to the conduit 15 upstream of inlet 12 of the main restrictor 11 and is arranged to supply a second gas under pressure to the restrictor 11.

Connected in the first supply conduit 15 is a control means comprising a differential pressure regulator 17 having an inlet 18 and outlet 19 for passage of the first gas through the differential pressure regulator, and a control port 20 connected by a control conduit 21 to communicate with the outlet 13 of the main flow regulator 11.

Connected in the second supply conduit 16 is a flow regulator means comprising a further flow restrictor 22 and a further differential pressure regulator 23. The differential pressure regulator 23 has inlet and outlet ports 24 and 25 respectively connected in series in the second supply conduit 16 upstream of the further restrictor 22, and has a control port 26 connected in communication with conduit 16 downstream of an outlet port 27 of the further restrictor 22. The further restrictor 22 has an inlet port 28 connected to receive the second gas from the differential pressure regulator 26.

Each of the differential pressure regulators 17 and 23 are connected as downstream differential pressure regulators and are so arranged that each differential pressure regulator, when operated within its design limitations, maintains a constant pressure difference between its outlet port and its control port. This epistatic control is effected (as will be described hereinafter with reference to FIG. 3) by varying the flow of gas through the differential pressure regulator in response to changes of pressure at the control port.

In the embodiment shown in FIG. 1 each of the restrictors 11 and 22 is arranged to impose a constant restriction upon the flow therethrough. The effect of the differential regulator 23 is to maintain a constant pressure across the restrictor 22, whereby the gas flow along the second supply conduit 16 is maintained substantially constant. The effect of the differential pressure regulator 17 is similarly to maintain a constant pressure difference across the main restrictor 11 and consequently to maintain at a constant rate the output flow along the output conduit 14. The significance of the apparatus shown in FIG. 1 is that the combined output gas in the outlet conduit 14 will be maintained at a constant rate despite any change in the rate of flow in the second supply conduit 16 which may be produced by changing the value of the restrictor 22. It will be appreciated that this allows variation of the proportions of the two gases combined by changing the restrictor 22, while maintaining the rate of flow of the combined output gas at a constant value.

The operation of the apparatus embodying the invention may be regarded as consisting of injection of an independently controlled flow of gas along the conduit 16 into the flow stream in the conduit 15 of a differential pressure regulator, prior to the passage of the latter's flow through the restrictor 11 across which the differential pressure regulator 17 is attempting to enforce a constant pressure drop. The flows in the apparatus shown in FIG. 1 may be considered as follows:

Let $F_t$ be the outlet flow of the system (the total flow).

Let $F_{to}$ be the outlet flow of the system when $F_i=0$.

Let $F_i$ be the flow of fluid controlled by the differential pressure regulator 23 (the injection flow).

If $F_i$ is less than $F_{to}$ then $F_t = F_{to}$.

If $F_i$ is greater than $F_{to}$ then $F_t = F_i$. (It is to be noted that $F_i$ is unaffected by $F_t$).

There will now be given by way of example typically of pressures and flows which may be used in the embodiment of the invention described.

Pressure at inlet port 24: 50 psi

Pressure difference across control port 26 and outlet port 25: 3 psi

Flow rate in conduit 16: 1 liter per min.

Pressure at inlet 18: 50 psi

Pressure difference across outlet port 19 and control port 20: 3 psi

Pressure at inlet 12: 3 psi

Pressure at outlet 13: ambient pressure

Flow rate through outlet conduit 14: 5 liters/minute

Figure 2:
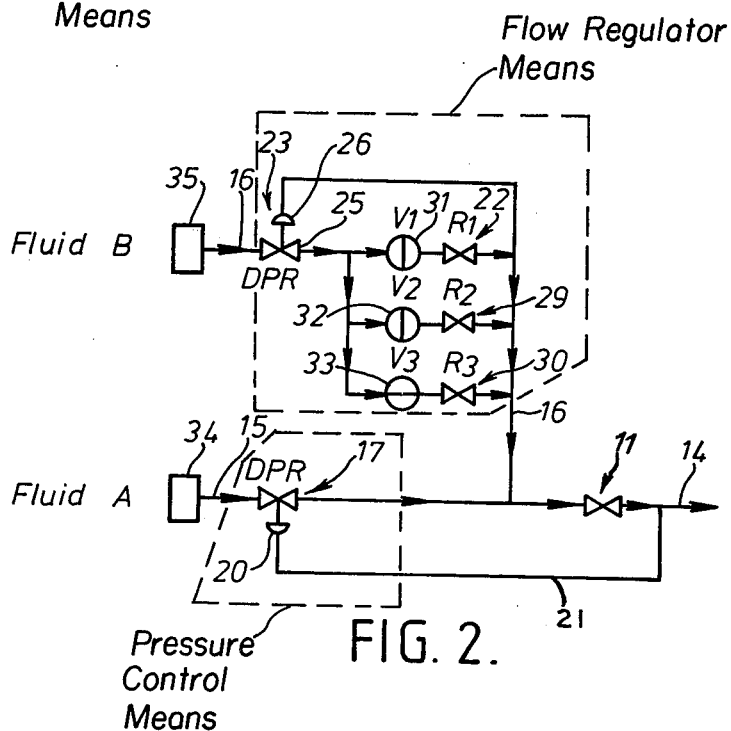
FIG. 2 shows in diagrammatic form a modification of the apparatus of FIG. 1 for combining two fluid flows in selectively variable proportions.

Referring now to FIG. 2 there is shown a modification of the apparatus of FIG. 1 which allows combination of two gases in selectively variable proportions. Elements in FIG. 2 which correspond to elements in FIG. 1 are indicated by like reference numerals. The modification consists in the provision of a plurality of further restrictors in parallel with the restrictor 22, and in FIG. 2 there are shown two further restrictors 29 and 30 connected in parallel with the restrictor 22 between the outlet 25 of the regulator 23 and the inlet 12 of the restrictor 11. Each restrictor 22, 29 and 30 has associated therewith a valve individual thereto, the valves being indicated at 31, 32 and 33 and being connected each in series with its associated restrictor. There is also shown in FIG. 2 in diagrammatic form a source 34 of a first gas for passage along the first conduit 15, and a second source 35 for supply of a second gas for passage along the second conduit 16. The sources 34 and 35 conveniently consist of cylinders of pressurized gas and may consist in one case of a diluent gas such as air under pressure and in the other case a standardized active constituent of a pollution gas such as propane. The sources 34 and 35 conveniently include on/off valves not shown. The outlet conduit 14 also conveniently includes a valve and coupling device (not shown) for connecting the outlet to equipment for measuring pollution gas.

In operation, the valves 31, 32 and 33 may be opened and closed in appropriate switching patterns to control flow through the restrictors 22, 29 and 30 to select the constant flow supplied along the second conduit 16. By selecting the appropriate flow, the proportion of gases combined at the outlet 14 can be achieved without variation of the total flow rate of the combined gas. Conveniently the restrictors 22, 29 and 30 may be arranged to have restriction values which vary in binary form, to allow by appropriate switching of valves 31, 32 and 33, variation of the flow along the conduit 16 in linear manner.

By way of example, if the restrictors 22, 29 and 30 have restriction values designated as R1, R2 and R3, and are arranged to restrict the flow through the restrictors such that the corresponding flows correspond to each other in a binary series of ratios $2^0$, $2^1$, $2^2$, then a linear series of injection flows $F_i$ can be obtained by appropriate selection of the controlling valves 31, 32 and 33.

By way of example the following values may be chosen:

$F_{to}$: 100 volumes/unit time
$F_{R1}$: 15 volumes/unit time
$F_{R2}$: 30 volumes/unit time
$F_{R3}$: 60 volumes/unit time From this there is provided a system in which the output has eight selectable states. If the two gases combined are represented by the letters A and B there are eight concentrations of B in A which are available as follows:

| Valve states | | | Concentration of B in A |
| --- | --- | --- | --- |
| V1 | V2 | V3 | (Vol %) |
| off | off | off | 0% |
| on | off | off | 15% |
| off | on | off | 30% |
| on | on | off | 45% |
| off | off | on | 60% |
| on | off | on | 75% |
| off | on | on | 90% |
| on | on | on | 100% |

It is to be noted that in all cases except the last, the flow $F_t$ remains as 100. In the last case the flow rises to a value of 105 volumes/per unit time. The reason for this change is as follows. As noted hereinbefore when $f_i$ to $f_{to}$, $f_t = f_1$, that is under these conditions all the flow along the outlet conduit 14 is derived from the inlet conduit 16, there being no additional flow derived from inlet conduit 15. Hence the outlet flow must be linear addition of flows through restrictors 22, 29 and 30, that is (60+30+15) volumes/unit time.

Figure 3:
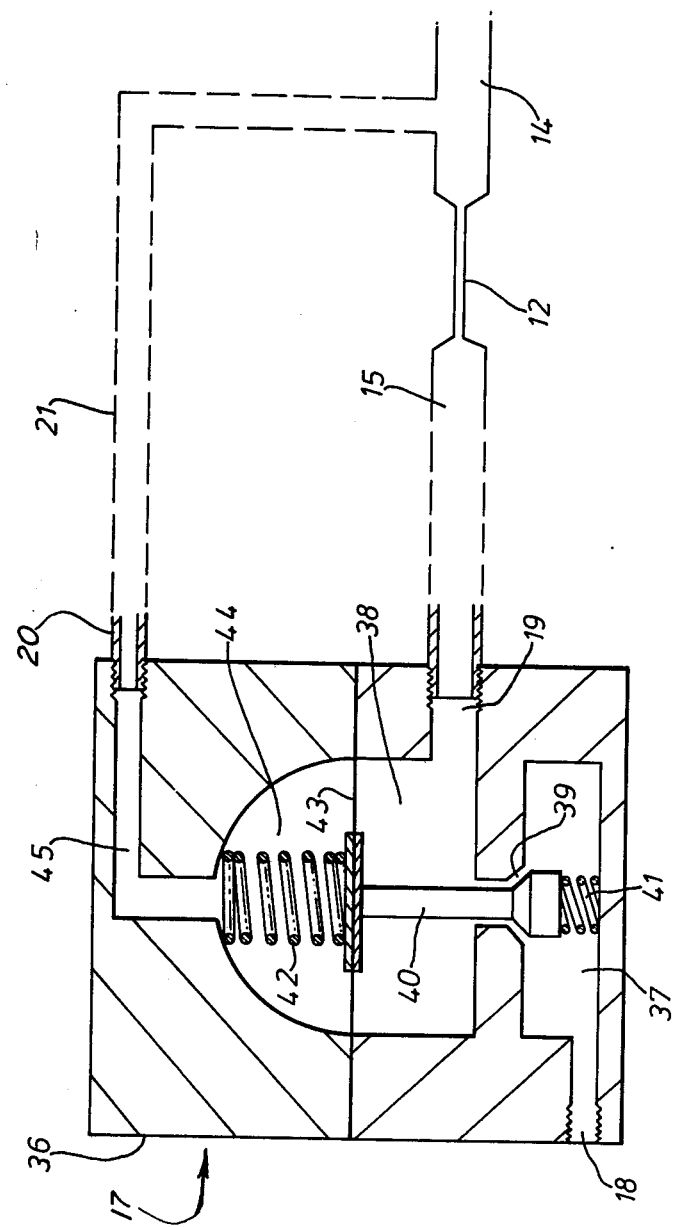
FIG. 3 shows one example of a differential pressure regulator which may be used in embodiments of the present invention, in diagrammatic form.

The restrictors 22, 29 and 30 of FIGS. 1 and 2 may conveniently be provided by capillary tubes of the different diameters. The differential pressure regulators shown in FIGS. 1 and 2 may each, by way of example be provided by a regulator such as is shown in FIG. 3. Referring to FIG. 3, the regulator (here indicated as 17) comprises a body 36 defining internal passageways 37 and 38 which are linked by a restricted passage 39 the cross section of which can be varied by vertical movement of a control member 40.

The control member 40 is urged in a upward direction by a spring 41 and in a downward direction by a matching spring 42 which is adjusted to ensure that the restricted passage 39 is normally slightly open. The control member 40 is mounted on a diaphragm 43 one side of which is exposed to the pressure of the passage 38, and the other side of which is exposed to pressure in a dome-shaped cavity 44 connected by a passage 45 to the control port 20 of the regulator 17. The passageway 37 is connected to the inlet port 18 of the regulator 17 and the passage 38 is connected to the outlet port 19 of the regulator 17.

With the regulator 17 connected as shown to the main restrictor 12 by the conduits 21 and 15, any change in the pressure at the outlet conduit 14 causes a corresponding change in the position of the diaphragm 43 which varies the restriction of the passage 39 so as to tend to restore the pressure difference between the control port 20 and the outlet 15.

Referring to FIG. 1, it is possible in some embodiments of the invention to replace the differential pressure regulator 23 by a forward pressure regulator (not shown) which maintains at its outlet port a pressure which is constant with reference to ambient atmospheric pressure. In the arrangement shown in FIG. 1 (with the outlet conduit 14 at ambient pressure) the effective operation of the apparatus is the same with such a forward pressure regulator. However, the differential pressure regulator 23 is preferable in that it allows the outlet conduit 14 to be connected to a receiving equipment at a pressure different from ambient pressure, and in such circumstances still maintains the required constant flow in the outlet conduit 14.

Advantages which arise from the particular apparatus illustrated in FIG. 2, include the fact that the combination of valve switching explained hereinbefore allows fewer capillaries to be used in obtaining the required variations in mixture of the outlet gas, but more importantly provides the main advantage of the present invention which is that variations in concentration in the outlet gas can be provided without the need to discard any of the resultant mixture.

In the description of the embodiment of the invention shown in FIG. 2, one series of flow rates through the restrictors 22, 29 and 30 has been suggested to be flows in the ratio of 15 to 30 to 60 volumes/unit time, where the total flow rate at the outlet 14 is arranged to be 100 volumes per unit time, except where all the valves 31, 32 and 33 are open when the output flow at 14 rises to 105 volumes per unit time. The latter case may be regarded as a special circumstance in the sense that the gases A and B are not combined, since the gas A is wholly shut off. By way of example of flow rates which may be used, the output flow rate $F_{to}$ may be arranged to be two liters per minute, but suitable embodiments can be constructed in which the output flow rate $F_{to}$ is in the range 1.5 to 6 liters per minute. It is to be appreciated that the various pressures applied, and restriction orifices chosen will need to be selected for any given application in accordance with normal workshop practice, but by way of example of the pressures involved, the sources of fluid 34 and 35 may each be set at approximately 25 psi, and each of the differential pressure regulators 23 and 17 may be such as to work in normal operation with a pressure difference of three psi between the outlet and control ports. The restrictors 22, 29 and 30 may be selected for example to give flow rates of 300 cc/minute, 600 cc per minute and 1200 cc per minute respectively. Conveniently, the pressure at the outlet conduit 14 may be arranged to be 6 psi in normal operation.

As has been mentioned, the restrictors 22, 29 30 and 12 may conveniently be provided by capillary tubing of lengths and diameters suitable to provide the required flows. In other arrangements, the required restrictions may be provided wholly or in part by orifices drilled in a gas divider manifold, for example, a manifold made of stainless steel. The diameters chosen will depend upon the flows required, length of the capillaries, and so on but may generally be in the region of 0.05 inches to 0.40 inches.

When selecting the restriction diameters for the restrictors 22, 29, 30 and 12, it is important to take account of the effects on the flow rate of the series coupling of each of the restrictors 22, 29 and 30 with the restrictor 12. The flow rate through a gas flow restrictor depends not only upon the pressure difference across the restrictor, but also upon the absolute pressure at the inlets and outlets. This effect is small, but needs to be taken into account when setting up the instrument. Thus if for example the restrictor 22 were to be chosen to be a 5 inch long capillary tube of 0.020 inch diameter operating with a pressure difference across the capillary of 3 psi, the flow would be approximately one liter per minute if the capillary exhausted to atmospheric pressure. If, for example, the restrictor 12 is of the same dimensions as the restrictor 22, and the restrictor 22 is then connected in series with the restrictor 12 as shown in FIG. 2, the flow through the restrictor 22 will not be the same as when the restrictor 22 exhausted to atmosphere. Not only will a difference in flow occur, but the flow difference will be an increase in flow from the previous rate when the restrictor exhausted to atmospheric pressure. A graph can be drawn relating flow rate through a restrictor orifice to a function of the pressure difference across the restrictor and the absolute pressure at the outlet, and this is of assistance in selecting the required restrictor dimensions.

There will now be described an example of the effect of changes in the static absolute pressure at an orifice on the flow rate through a given restriction, even though the differential pressure across the restriction is unaltered, in order to exemplify the factors which need to be taken into account when setting up the restrictors 22, 29 and 30. Considering first a restrictor R1 which allows a flow rate of 1 liter per minute through it exhausting into ambient pressure with a pressure drop of 3 psi across the restrictor, the effect of introducing a further capillary downstream of the first restrictor will be to increase the pressure at the inlet and outlet of the first restrictor. Supposing that the second restrictor R2 causes a pressure drop of 2 psi across itself when the restrictor R1 has a drop of 3 psi maintained across it. It will then be found by experiment that the final output flow of the gas (having flowed through both restrictors R1 and R2) will have risen to about 1.07 liters/minute.

A relatively accurate prediction of the flow changes effected by a change in the static absolute pressure is given by the following equation:

$$F1\ P1/L1 = F2\ P2/L2$$

where P equals the pressure upstream of the restrictor, L equals the final output flow. The value of F is proportional to $$(P)/(P_D) - 1$$

(where $P_D$ is the pressure downstream of the said restrictor), the relationship being approximate.

Continuing to consider the above example, the change in the final mixture of two gases caused by a change in the output pressure in the Example shown in FIG. 1 can be derived by supposing firstly that the outlet pressure at 14 is 14.7 psia, the pressure at the outlet 13 of the restrictor 11 is 17.7 psia, and the pressure at the inlet 28 to the restrictor 22 is 20.7 psia. In this example it is further assumed that the restrictor 22 and restrictor 11 have been chosen such that a total output flow of 1 liter per minute is observed and such that the output gas consists of 10% of the gas entering at conduit 16 and 90% of the gas entering at conduit 15.

If now in the use of the apparatus in testing pollution equipment, there is introduced after the restrictor 11 equipment having the effect of a further restrictor R3 such as to raise the pressure at the outlet 14 to say 16.7 psi (for example a restrictor R3 chosen arbitrary to allow a 2 psi drop across it) changes will occur in both the final output flow and in the mixture of the two gases. Provided that the pressure difference of 3 psi is maintained across the restrictor 11 and the restrictor 22 (as arranged in accordance with the invention as set out above) then the change produced by the increase in exhaust pressure at the outlet 14, has been found in a particular example to be that the final output flow at the outlet 14 increases to 1.070 liters per minute, and that the gas mixtures changes to 9.887 percent of the gas entering at the conduit 16, and 90.113 percent of the gas entering at the conduit 15. Thus it will be seen that the final adjustments of the instrument in accordance with normal practice in the art, will need to take account of the pressure into which the outlet 14 will exhaust in any particular application. However it is to be appreciated that the arrangements embodying the invention as set out above, allow the maintenance of a substantially constant output flow during variations of the flow along the conduit 16 in FIG. 2 due to those combinations of the valves 31, 32 and 33 which produce different combinations of the two fluids from the sources 34 and 35.

Finally, attention is drawn again to the fact that in the particular arrangement shown in FIG. 2, there is an increase in output flow at 14 where the combination of valves 31, 32 and 33 is chosen to be such that all valves are open at once. In this circumstance, the flow along the conduit 16 and at the outlet 14 amounts to 105 percent of the flow with all other combinations. The extra pressure resulting in these circumstances is used to force the diaphragm of the differential pressure regulator 17 to close entirely the flow of gas from the source 34 through the differential pressure regulator 17, and allows only the differential pressure regulator 23 to deliver the gas from the source 35.

Where reference has been made in the previous description to various flow rates it should be noted that the units of volume/unit time are derived from measurement of the flows at a constant downstream pressure, thus in FIG. 1, the flow of gas through restrictor 22 measured in volume/unit time will be less than its flow measured in the same units through restrictor 11 because of the elevated downstream pressure in the first case.

The method of calibrating the flow rates through each of the orifices is by using a tube of glass with a known marked volume, and measuring the time that an induced soap bubble, pocketing the gas, from the orifice, takes to traverse this given volume into a known pressure.

The pressure difference across each of the orifices is measured using tubes of water and the height of the displaced water is measured to derive pressure. These measurements, together with the equation for orifices in series, allow the apparatus to be regarded as a primary method of blending gases together accurately for the purposes of calibrating pollution measuring equipment.

Obviously, many modifications and variations of the present invention are possible in light of the foregoing teachings. It is to be understood therefore that within the scope of the appended claims, the present invention may be practiced otherwise than as specifically described herein.

We claim:

1. A method of combining fluid flows comprising the steps of:
    passing a flow of a first fluid through a controlled variable flow restriction;
    combining the output of said first fluid from the controlled flow restriction with a flow of a second fluid;
    passing the combined flow of the first and second fluids through a main flow restriction;
    sensing the pressure of said combined flow downstream of said main flow restriction;
    varying the rate of flow of the second fluid relative to the rate of flow of the first fluid so as to vary the proportions of the fluids combined together; and
    varying said controlled variable flow restriction, and thereby the flow of said first fluid, in dependence upon said sensed pressure at the output of said main flow restriction in such a manner as to maintain substantially constant the pressure across the main restriction and to maintain substantially constant the rate of flow of the output of combined fluids from the main restriction despite changes in the rate of flow of the second fluid which is being combined with the first fluid.

2. A method of providing a test gas for testing a pollution measuring equipment, comprising supplying as a first fluid a diluent gas, supplying as a second fluid an active constituent of a pollution gas, combining the active constituent gas and diluent gas in selectively variable proportions in accordance with the method set out in claim 1, and passing through the equipment under test the combined output test gas at a total flow rate which is maintained substantially constant in normal operation despite changes in the proportions of the gases combined.

3. Apparatus for combining fluid flows in variable proportions in a combined flow of substantially constant flow rate, comprising:
    a main flow restrictor for providing a constant flow through the restrictor for a given restriction of the restrictor when a constant pressure is applied across the restrictor, said restrictor having an inlet and an outlet for flow of fluid through the restrictor;
    a first supply conduit for supplying a first fluid to the inlet of the restrictor;
    a second supply conduit for supplying a second fluid to the inlet of the restrictor;
    selectively variable flow regulator means connected in the second supply conduit for providing a selectively variable flow along the second supply conduit; and
    pressure control means connected in the first supply conduit upstream of the supply of second fluid to the restrictor by the second supply conduit, said pressure control means also being coupled fluidically to the outlet of said flow restrictor, and being arranged to vary the flow in the first supply conduit in response to changes in flow in the second supply conduit so as to maintain the pressure across the restrictor substantially constant, and to maintain the output flow from the restrictor substantially constant despite changes in the composition of the combined output fluid flow.

4. Apparatus according to claim 3 in which the control means comprises a control device having an inlet port and an outlet port, and a control port, the control device being adapted to vary the flow of fluid through the control device in response to changes in the pressure at the control port in such a manner as to tend to maintain a constant pressure difference between the outlet and control ports of the control device, the inlet and outlet ports of the control device being connected in the first supply conduit for passage of the first fluid through the control device and the control port thereof being connected to communicate with the outlet of said main flow restrictor.

5. Apparatus according to claim 3 in which the flow regulator means comprises a further flow restrictor connected in the second supply conduit and a further control device having an inlet port and an outlet port and a control port, the further control device being adapted to vary the flow of fluid through the further control device in response to changes in the pressure at the control port in such a manner as to tend to maintain a constant pressure difference between the outlet and control ports of the control device, the inlet and outlet ports of the further control device being connected in the second supply conduit upstream of the further flow restrictor for flow of the second fluid through the further control device to the further flow restrictor, the control port of the further control device being connected to communicate with the outlet of the further flow restrictor and the control device being arranged in such a manner as to maintain substantially constant the pressure across the further flow restrictor to maintain substantially constant the flow from the further flow restrictor along the second supply conduit for a given restriction therein.

6. Apparatus according to claim 5 in which said flow regulator means comprises a plurality of further flow restrictors connected in parallel between the outlet of the said further control device and the inlet of the main flow restrictor, and a plurality of valves connected to allow the flow along the second supply conduit to be selectively switched through different further flow restrictors or combinations of different further flow restrictors.

7. Apparatus for providing a test gas for testing a pollution measuring equipment, comprising means for supplying an active constituent of a pollution gas, means for supplying a diluent gas, and apparatus as set out in accordance with claim 3 for combining the active constituent gas and the diluent gas in selectively variable proportions, said combining apparatus being arranged to provide a combined output test gas having a total flow which is maintained substantially constant in normal operation despite changes in the proportions of gases combined.

8. Apparatus for combining fluid flows in variable proportions comprising
a main flow restrictor having an inlet and an outlet for flow of fluid through the restrictor,
a first supply conduit for supplying a first fluid to the inlet of the main flow restrictor,
a second supply conduit for supplying a second fluid to the inlet of the main flow restrictor,
first and second control devices, each control device having individual thereto an inlet port, an outlet port, and a control port for varying the flow of fluid through the control device in response to changes in the pressure at the control port and in such a manner as to tend to maintain a constant pressure difference between the outlet and control ports of the control device,
a plurality of further flow restrictors connected in parallel with each other in the second supply conduit,
a plurality of switchable valves connected to allow the flow along the second supply conduit to be selectively switched through different further flow restrictors or combinations of different further flow restrictors so as to vary the flow rate along the second supply conduit,
the inlet and outlet ports of the first control device being connected in the first supply conduit for passage of the first fluid through the first control device, and the inlet and outlet ports of the second control device being connected in the second supply conduit upstream of the said further flow restrictors for passage of the second fluid through the second control device, the control port of the second control device being connected to communicate with the outlets of the said further flow restrictors at a common junction thereof for maintaining the flow through the second supply conduit substantially constant for any given selected combination of the further flow restrictors, and the control port of the first control device being connected to communicate with the outlet of the main flow restrictor for maintaining the output flow from the main flow restrictor substantially constant despite changes in the flow of fluid in the second supply conduit due to selection of different combinations of the further flow restrictors for the purpose of varying the proportions of first and second fluids combined.

* * * * *